United States Patent [19]

Kondo

[11] Patent Number: 4,672,174

[45] Date of Patent: Jun. 9, 1987

[54] MONITORING STUD-WELDING-PHOTOTRANSISTOR RESPONDS TO ARC LIGHT

[75] Inventor: Yoshiteru Kondo, Toyohashi, Japan

[73] Assignee: USM Corporation, Farmington, Conn.

[21] Appl. No.: 843,899

[22] Filed: Mar. 25, 1986

[51] Int. Cl.$^4$ .............................................. B23K 9/20
[52] U.S. Cl. ................................ 219/130.01; 219/98; 219/99
[58] Field of Search ................. 219/98, 99, 130.01

[56] References Cited

U.S. PATENT DOCUMENTS 4,417,120 11/1983 Lumbra et al. ..................... 219/98

Primary Examiner—Clifford C. Shaw
Attorney, Agent, or Firm—Aubrey C. Brine

[57] ABSTRACT

Apparatus and method are provided for sensing the presence of arc discharge in arc welding such that the change in electric current is sensed at the time of discharge and light emitted from a welding position is sensed only when the sensed electric current surpasses a predetermined level.

7 Claims, 2 Drawing Figures

4,672,174

MONITORING STUD-WELDING-PHOTOTRANSISTOR RESPONDS TO ARC LIGHT

BACKGROUND OF THE INVENTION

The present invention relates to a method and an apparatus for sensing the presence of arc discharge in an arc discharging circuit.

In order to determine the welding quality in an arc welding device, there is a known method for sensing its welding current. The method is convenient as the welding current is sensed easily by providing a transformer (current transformer) in an electric current feeding line. However, it is sometimes activated erroneously by inductive noise from the outside and there also is a situation where a large electric current flows without arc discharge because of a base material coming in contact with a work-piece and it is erroneously sensed as arc discharge.

For the purpose of dealing with such errors, there is a known method for sensing arc light to determine the quality of arc discharge. It can be said that as a method for sensing the presence of arc discharge, this method is better than the method in which an electric current is sensed.

However, even in the method for sensing arc light, the apparatus may be activated mistakenly by light in a surrounding area or arc light of another welding operation which is carried on at close quarters. This problem can be solved by shading light in the surrounding area, however, to structure such shading is difficult since it affects arc discharge and is expensive.

Accordingly, the present invention aims to provide a method and an apparatus that can sense the presence of arc discharge easily and reliably.

SUMMARY OF THE INVENTION

In order to achieve the object described above, according to the present invention, there is provided a method comprising sensing a change in electric current at the time of discharge, and sensing light to be emitted from a welding position only when the sensed electric current surpasses a predetermined level, whereby the presence of arc discharge is sensed. According to this method, since arc discharge is sensed simultaneously with a change in electric current at the time of arc discharge, the problems caused by sensing solely an electric current is solved, and influence of light from other sources can be eliminated as arc light is sensed in synchronism with the welding current, resulting in accurate sensing of valid arc discharge.

For carrying out the method of the present invention as described above, the present invention provides an apparatus for sensing arc welding operation comprising means for sensing a welding current from a welding current feeding line of a welder to produce a predetermined voltage, photoreceptor means disposed adjacent the welding position to be activated by the voltage producing means, and means for receiving a signal from said photoreceptor means to output a valid arc discharge signal. Thus, the above method is effectively carried out with an extremely simple construction.

DESCRIPTION OF THE PREFERRED EMBODIMENTS

The present invention is described further by way of the embodiments, referring to accompanying drawings.

Figure 1:
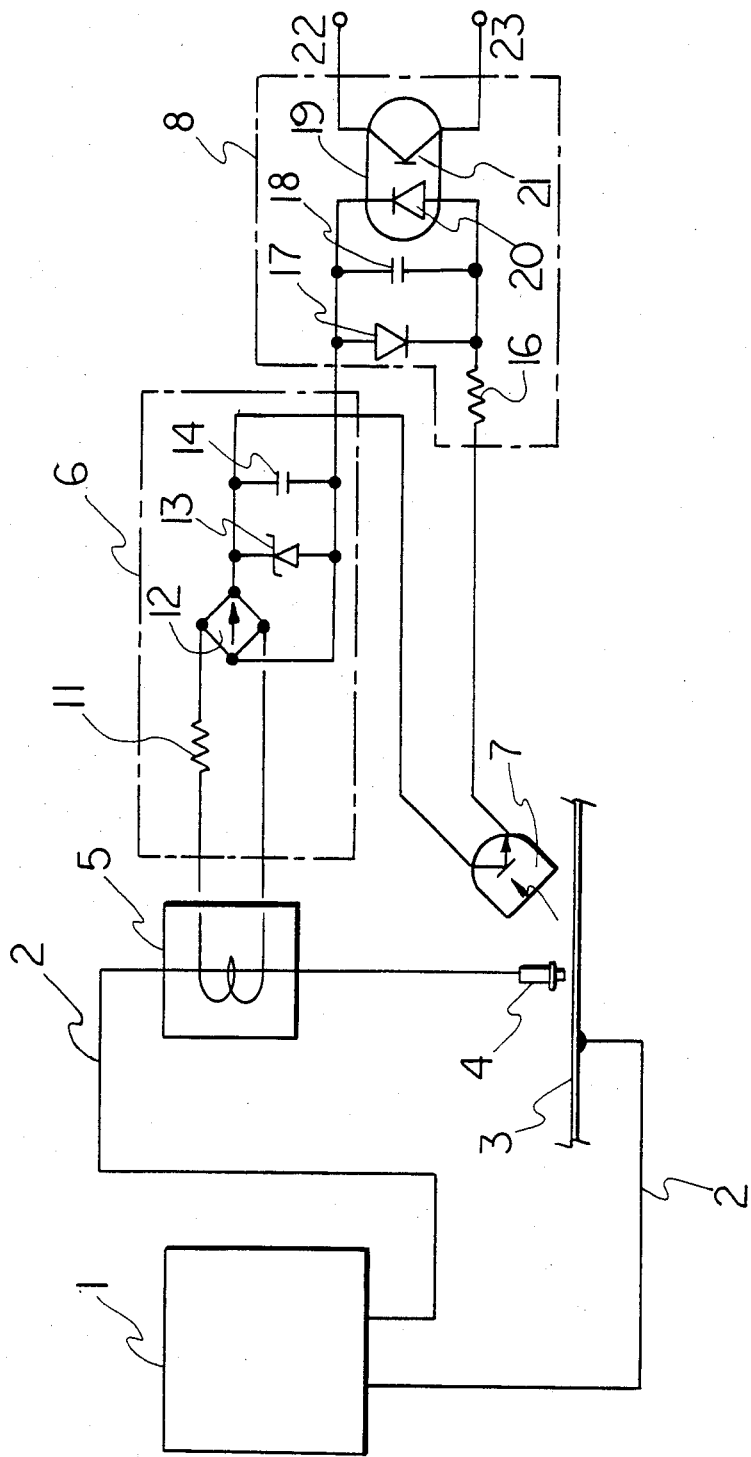
FIG. 1 is a circuit diagram showing an embodiment of apparatus for sensing arc discharge welding operation according to the present invention.

In FIG. 1, two welding current feeding lines 2, 2 extend from an arc discharge device 1, one of which is connected to a base material 3 while the other is connected to, for example, a stud 4. In one of the lines 2, 2, a current transformer 5 for sensing a welding current is located to receive an electric current which flows in the line 2.

An apparatus for sensing welding operation according to the present invention comprises the aforementioned current transformer 5, a regulator 6 for rectifying the electric current received from the current transformer 5 to produce a predetermined voltage, a photoreceptor (phototransistor 7 in the embodiment shown in the drawing) for sensing arc light at the time of arc discharge, and an output portion 8 which emits a good arc discharge signal in response to a signal received from the photoreceptor, or the phototransistor 7. In the abovedescribed construction, the current transformer 5 and the regulator 6 comprise means for sensing a welding current and producing a voltage while the output portion 8 functions to electrically treat and shape the signal from the phototransistor 7. Basically, the phototransistor 7 alone can serve as signal output means.

The regulator 6 receives an electric current output from the current transformer 5 to rectify it with a rectifier 12 through a resistor 11, and smoothes it with a diode (Zener diode) 13 and a capacitor 14 to produce a predetermined voltage.

The phototransistor 7, as the photoreceptor, is attach to the tip of a welding gun (not shown in the drawing) at such a position that it receives arc light at the time of welding. The phototransistor 7 is supplied with the voltage from the regulator 6 to vary an amount of output electric current in response to the impedance which changes in accordance with the intensity of light received. As long as the phototransistor 7 is not fed with the predetermined voltage from the regulator 6, the phototransistor 7 is in an inoperative condition (i.e., not activated).

As mentioned above, the output portion 8 is basically a supplement, however, it is preferred because a signal from the phototransistor 7 includes noise and is dim. In the output portion 8, a resistor 16 is provided in an input portion to preferably suppress excessive signal current, and then a diode 17 and a capacitor 18 delete harmful noise. The signal from which noise has been removed is supplied to a light emitting element 20 of a photocoupler 19, and its light output is received by a light receiving element 21. An output from the light receiving element 21 (output form a collector and an emitter) is forwarded to terminals 22, 23. Thus, the output has been electrically isolated by the photocoupler 19, and problems such as interaction are not caused even if another electric circuit is connected to the output.

In operation, when a large electric current at a predetermined level passes through the welding current feeding lines, a predetermined voltage is produced by the current transformer 5 and the regulator 6 to activate the phototransistor 7 as the photoreceptor. When arc light is produced between the stud 4 and the base material 3 at that time, the phototransistor 7 senses the light to activate the light emitting element 20 of the photocoupler 19 of the output portion 8 to output a short circuit signal (ON) to the terminals 22, 23. Unless a large electric current corresponding to the welding current passes through the lines 2, the regulator 6 does not produce the predetermined voltage, nor does the phototransistor 7 change the impedance even if it receives light from the outside. The phototransistor 7 is activated by inductive noise or a large electric current which is supplied to the line by contact between the stud 4 and the base material 3. However, the impedance of the phototransistor 7 does not undergo any change because no arc light is emitted and hence, no output. That is to say, a signal is outputted only when an actual welding current flows and arc light is emitted. Thus, valid arc discharge can be confirmed very accurately.

Figure 2:
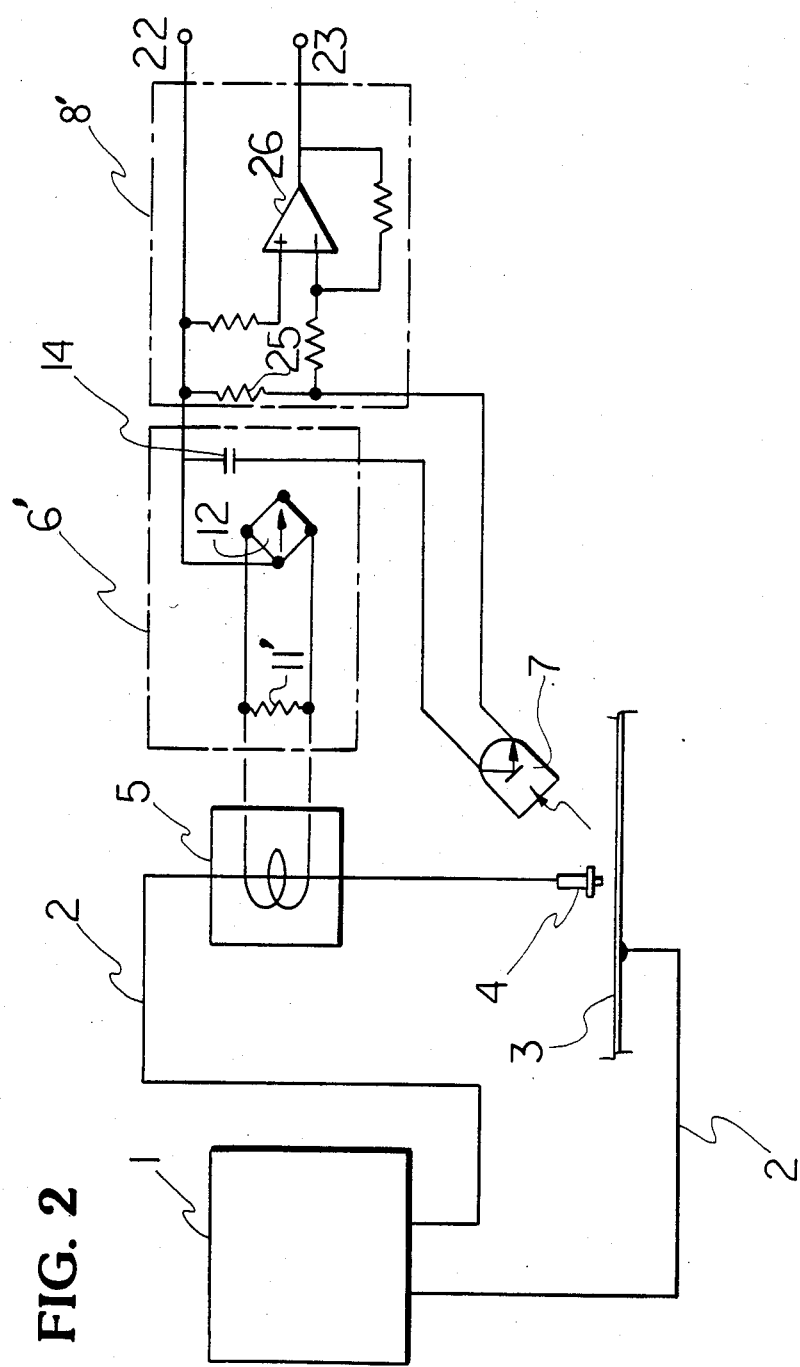
FIG. 2 is a circuit diagram of an alternate embodiment.

FIG. 2 shows another embodiment according to the present invention.

In this embodiment, significant difference from the embodiment of FIG. 1 is found in an output portion 8'. The rest remains unchanged except a regulator 6' which is slightly changed. In the regulator 6', a resistor 11' is connected parallel to the current transformer 5. The rectifier 12 rectifies the electric current and the capacitor 14 smoothes it. The phototransistor 7 is activated by a voltage from the regulator 6' and changes its output electric current upon receipt of arc light. The output unit 8' converts an electric current output from the phototransistor 7 into a voltage by a resistor, and outputs voltage amplified by an operational amplifier 26 to the terminals 22, 23. It is advantageous that in the embodiment of FIG. 7, an amount of the output signal is proportional to the intensity of light received by the phototransistor 7 (i.e., the intensity of light emitted at the time of welding). Since this embodiment operates in the same way as the embodiment of FIG. 1, the explanation is omitted.

According to the present invention, since valid arc discharge is sensed by double sensing of the presence of a welding current and of arc light in the presence of the welding current, the confirmation is extremely accurate. Because of the sensing of an electric current synchronized with emission of arc light, false acknowledgement due to erroneous action can be avoided. Furthermore, the apparatus is of very simple construction and its manufacturing cost can be held at a remarkably low level.

I claim:

1. A method for sensing the presence of arc discharge in an arc welding device wherein an arc discharge device is connected by current feeding lines to a workpiece and to an article to be welded thereto at a welding position comprising the steps of sensing the magnitude of electric current passing through the current feeding lines and sensing the presence of light emitted at the welding position only when the sensed electric current surpasses a predetermined level, whereby the presence of a valid arc discharge is confirmed.

2. Apparatus for sensing arc discharge in a welding operation wherein an arc discharge device is connected by current feeding lines to a workpiece and to an article to be welded thereto at a work area comprising voltage producing means for sensing electric current passing through one of said current feeding lines to produce aa predetermined voltage, said voltage producing means being connected to a photoreceptor means disposed adjacent the welding position for applying a voltage thereto, and signalling means for receiving an output from said photoreceptor to indicate a valid arc discharge signal.

3. The apparatus according to claim 2 wherein said voltage producing means comprises a transformer provided in the welding current feeding line and a regulator for rectifying an electric current from said transformer to produce a predetermined voltage.

4. The apparatus according to claim 2 wherein the photoreceptor means is a phototransistor.

5. The apparatus according to claim 2 wherein the photoreceptor means and said signallling means are composed of one phototransistor, and an impedance change in said transistor is effective to provide said output to indicate a valid arc discharge 6. The apparatus according to claim 2 wherein said signalling means comprises a photocoupler which outputs a signal electrically isolated from the apparatus.

7. The apparatus according to claim 2 wherein said signalling means is an amplifier which outputs a signal in response to the welding current and the intensity of the arc light.

* * * * *